(12) United States Patent
Lee et al.

(10) Patent No.: US 11,394,435 B2
(45) Date of Patent: Jul. 19, 2022

(54) ELECTRONIC DEVICE INCLUDING PLURALITY OF PANEL ANTENNAS AND OPERATING METHOD THEREOF

(71) Applicant: SAMSUNG ELECTRONICS CO., LTD., Suwon-si (KR)

(72) Inventors: Junho Lee, Hwaseong-si (KR); Yangsoo Kwon, Seoul (KR); Donghyeon Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/221,403

(22) Filed: Apr. 2, 2021

(65) Prior Publication Data

US 2021/0226677 A1 Jul. 22, 2021

Related U.S. Application Data

(63) Continuation of application No. 16/845,740, filed on Apr. 10, 2020, now Pat. No. 10,992,355.

(30) Foreign Application Priority Data

Apr. 12, 2019 (KR) .................. 10-2019-0043303
Aug. 5, 2019 (KR) .................. 10-2019-0095171

(51) Int. Cl.
*H04K 1/10* (2006.01)
*H04L 27/28* (2006.01)
*H04B 7/0456* (2017.01)
*H04B 7/08* (2006.01)

(52) U.S. Cl.
CPC ......... *H04B 7/0456* (2013.01); *H04B 7/0834* (2013.01)

(58) Field of Classification Search
CPC .. H04B 7/0456; H04B 7/0834; H04B 7/0691; H04B 7/0478; G06F 1/1698; G06F 1/206; H01Q 1/243
USPC ....... 375/260, 267, 299, 347, 295, 316, 219, 375/220, 346
See application file for complete search history.

(56) References Cited

U.S. PATENT DOCUMENTS

| | | | |
|---|---|---|---|
| 9,071,647 B2 | 6/2015 | Nagata et al. | |
| 9,112,562 B2 | 8/2015 | Li et al. | |
| 9,872,296 B2 | 1/2018 | Raghavan et al. | |
| 10,110,286 B2 | 10/2018 | Onggosanusi et al. | |
| 10,992,355 B2 * | 4/2021 | Lee | H04B 7/0691 |
| 2011/0250928 A1 * | 10/2011 | Schlub | H01Q 1/243 |
| | | | 455/550.1 |
| 2013/0057432 A1 | 3/2013 | Rajagopal et al. | |
| 2016/0013849 A1 * | 1/2016 | Kakishima | H04B 7/0478 |
| | | | 375/267 |

(Continued)

FOREIGN PATENT DOCUMENTS

KR 10-2019-0027757 A 3/2019

*Primary Examiner* — Phuong Phu
(74) *Attorney, Agent, or Firm* — Sughrue Mion, PLLC

(57) ABSTRACT

An operating method of an electronic device including a plurality of panel antennas and storing information about a plurality of codebooks includes: determining at least one panel antenna among the plurality of panel antennas based on environmental information; receiving control information from a base station; and selecting an optimal codebook among the plurality of codebooks based on the determined at least one panel antenna and the received control information.

20 Claims, 12 Drawing Sheets

(56) References Cited

U.S. PATENT DOCUMENTS

2018/0077284 A1 3/2018 Nam et al.
2018/0316407 A1 11/2018 Rahman et al.
2019/0097710 A1 3/2019 Park et al.
2020/0192442 A1* 6/2020 Islam .................... G06F 1/1698

* cited by examiner

ELECTRONIC DEVICE INCLUDING PLURALITY OF PANEL ANTENNAS AND OPERATING METHOD THEREOF

CROSS-REFERENCE TO RELATED APPLICATIONS

This application is a continuation of U.S. patent application Ser. No. 16/845,740, filed on Apr. 10, 2020, which is based on and claims priority from Korean Patent Application Nos. 10-2019-0043303, filed on Apr. 12, 2019 and 10-2019-0095171, filed on Aug. 5, 2019, in the Korean Intellectual Property Office, the disclosures of which are incorporated herein in their entirety by reference.

BACKGROUND

The disclosure relates to a wireless communication system and, more specifically, to beamforming based on an optimal codebook of an electronic device including a plurality of panel antennas in a wireless communication system.

Recently, there has been efforts for developing an enhanced 5G communication system or pre-5G communication system to meet wireless data traffic demands increasing since fourth generation (4G) communication system commercialization. For this reason, the 5G communication system or pre-5G communication system is called a beyond 4g network communication system or a post long term evolution (LTE) system.

In order to achieve a high data transmission rate, the 5G communication system is implemented in a super high frequency (mmWave) band (e.g., 60-GHz band). Moreover, in order to alleviate path loss of electronic waves and increase a transmission distance of the electronic waves in the super high frequency band for the 5G communication system, beamforming, massive multiple-input multiple-output (MIMO), full dimensional MIMO (FD-MIMO), array antenna, analog beamforming, digital beamforming, hybrid beamforming, and large scale antenna techniques have been discussed.

SUMMARY

The disclosure provides an electronic device, which has a plurality of panel antennas, for selecting an optimal codebook based on environmental information.

According to an aspect of the disclosure, there is provided an operating method of an electronic device having a plurality of panel antennas and storing information about a plurality of codebooks, the operating method comprising: determining at least one panel antenna, among the plurality of panel antennas, based on environmental information corresponding to one or more of the plurality of panel antennas; receiving control information from a base station; and selecting an optimal codebook, among the plurality of codebooks, based on the determined at least one panel antenna and the received control information.

According to another aspect of the disclosure, there is provided an electronic device comprising: a communication interface comprising a plurality of panel antennas; a storage storing information about a plurality of codebooks; and a controller configured to determine at least one panel antenna among the plurality of panel antennas based on environmental information corresponding to one or more of the plurality of panel antennas, receive control information from a base station by using the communication interface, and select an optimal codebook among the plurality of codebooks based on the determined at least one panel antenna and the received control information.

According to an aspect of the disclosure, there is provided a wireless communication system comprising: a base station configured to transmit control information to an electronic device; and the electronic device configured to: determine at least one panel antenna among a plurality of panel antennas based on environmental information corresponding to one or more of the plurality of panel antennas, select an optimal codebook among a plurality of codebooks based on the determined at least one panel antenna and the control information, and perform beamforming based on the selected optimal codebook, wherein the environmental information comprises at least one of temperature information, power consumption information, and channel state information of each of the plurality of panel antennas, and wherein the control information comprises timing information about a time interval at which a reference signal for beam sweeping is transmitted and beam-related configuration information.

According to an aspect of the disclosure, there is provided an electronic device comprising: a memory storing one or more instructions; and a processor configured to execute the one or more instructions to: determine at least one panel antenna, among a plurality of panel antennas, based on information corresponding to one or more of the plurality of panel antennas; receive control information from a base station; and select an optimal codebook, among a plurality of codebooks, based on the determined at least one panel antenna and the received control information.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Figure 1:
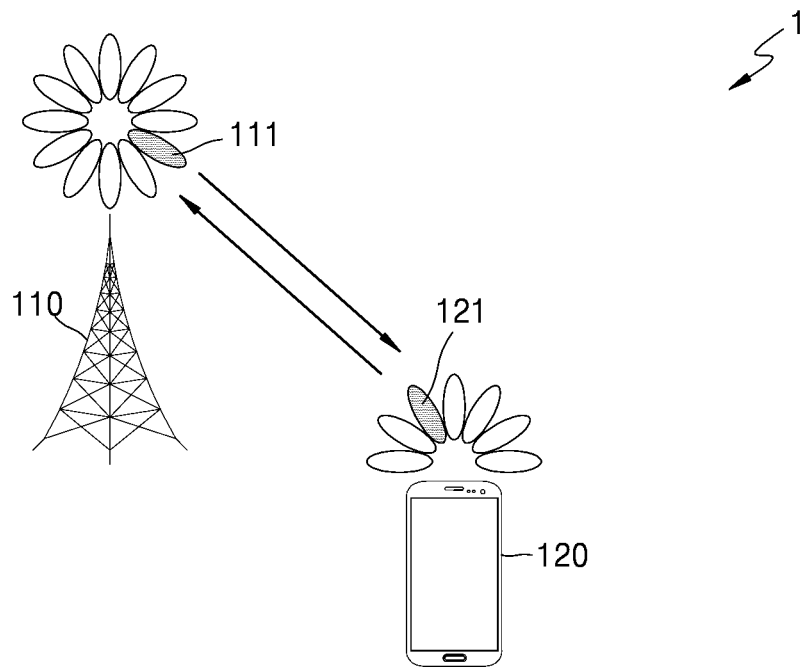
FIG. 1 illustrates a wireless communication system according to example embodiments of the disclosure.

FIG. 1 illustrates a wireless communication system according to example embodiments of the disclosure.

Referring to FIG. 1, according to example embodiments, a base station 110 and an electronic device 120 are provided in a wireless communication system 1. The base station 110 and the electronic device 120 may be illustrated as nodes using a radio channel in the wireless communication system 1.

The base station 110 is a network infrastructure which provides a wireless connection to the electronic device 120. The base station 110 may have a coverage defined as a certain geographical region based on a signal transmittable distance. The base station 110 may be replaced by 'access point (AP)', 'eNodeB (eNB)', '5th generation (5G) node', 'wireless point', or other terms having the technical meaning equivalent thereto.

According to various example embodiments of the disclosure, the base station 110 may be connected to one or more 'transmission/reception points (TRPs)'. The base station 110 may transmit a downlink signal to the electronic device 120 or receive an uplink signal from the electronic device 120, through the one or more TRPs.

The electronic device 120 is a device used by a user and may communicate with the base station 110 through a radio channel. The electronic device 120 may be replaced by a 'terminal', 'user equipment (UE)', a 'mobile station', a 'subscriber station', customer premises equipment (CPE)', a 'remote terminal', a 'wireless terminal', a 'user device', or other terms having the technical meaning equivalent thereto.

The base station 110 and the electronic device 120 may transmit and receive a radio signal in a mmWave band (e.g., 28 GHz, 30 GHz, 38 GHz, or 60 GHz). To overcome a high attenuation characteristic of the mmWave, the base station 110 and the electronic device 120 may perform beamforming. Herein, the beamforming may include transmission beamforming and reception beamforming. That is, the base station 110 and the electronic device 120 may grant directivity to a transmission signal or a reception signal. To this end, the base station 110 and the electronic device 120 may select an optimal beam for wireless communication through a beam search, beam training, or beam management procedure.

Figure 2:
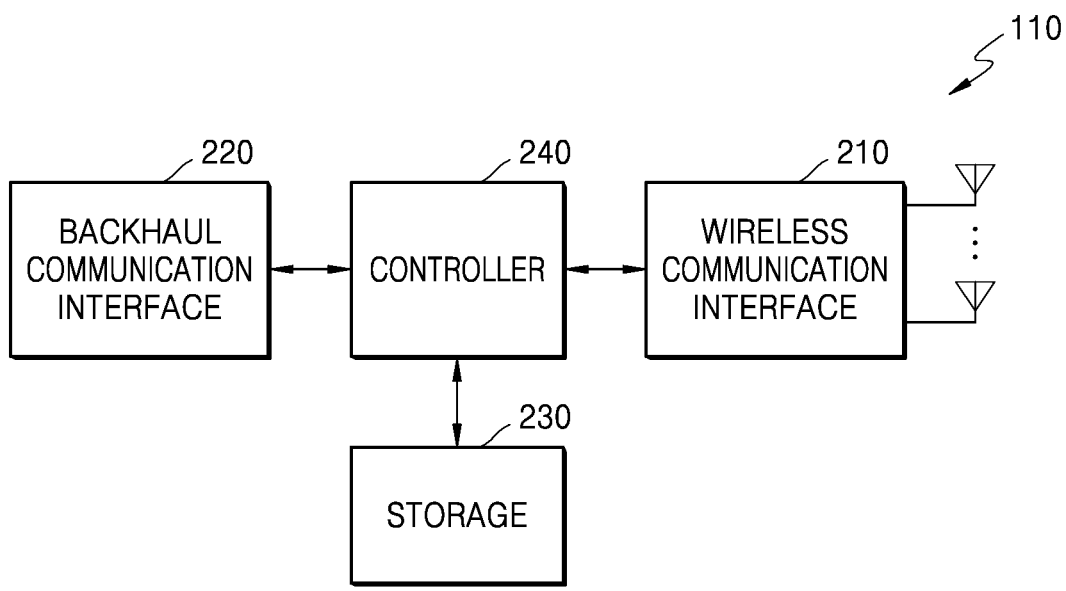
FIG. 2 is a block diagram of a base station according to example embodiments of the disclosure.

FIG. 2 is a block diagram of a base station according to example embodiments of the disclosure.

Referring to FIG. 2, the base station 110 may include a wireless communication interface 210, a backhaul communication interface 220, a storage 230, and a controller 240.

The wireless communication interface 210 may perform functions for transmitting and receiving a signal through a radio channel. According to an example embodiment of the disclosure, the wireless communication interface 210 may perform a conversion function between a baseband signal and a bitstream according to a physical layer standard of a system. For example, the wireless communication interface 210 may generate complex symbols by encoding and modulating a transmission bitstream during data transmission and restore a reception bitstream by demodulating and decoding a baseband signal during data reception. In addition, the wireless communication interface 210 may up-convert a baseband signal into a radio frequency (RF) band signal and then transmit the RF band signal through an antenna, or down-convert an RF band signal received through the antenna into a baseband signal. To this end, the wireless communication interface 210 may include a transmission filter, a reception filter, an amplifier, a mixer, an oscillator, a digital to analog converter (DAC), an analog to digital converter (ADC), and the like.

Moreover, the wireless communication interface 210 may transmit and receive a signal. For example, the wireless communication interface 210 may transmit a synchronization signal, a reference signal, system information, a message, control information, data, or the like. In addition, the wireless communication interface 210 may perform beamforming. The wireless communication interface 210 may apply a beamforming weight to a signal to be transmitted or received in order to grant directivity to the signal. The wireless communication interface 210 may repetitively transmit a signal by changing a beam to be formed.

According to an example embodiment, the backhaul communication interface 220 may provide an interface for communicating with other nodes in a network. That is, the backhaul communication interface 220 may convert a bitstream to be transmitted from the base station 110 to another node, e.g., another access node, another base station, a parent node, a core network, or the like, into a physical signal and convert a physical signal received from another node into a bitstream.

According to an example embodiment, the storage 230 may store basic programs for an operation of the base station 110, application programs, and data such as configuration information. The storage 230 may include a volatile memory, a nonvolatile memory, or a combination of the volatile memory and the nonvolatile memory.

According to an example embodiment, the controller 240 may control an operation of the base station 110. For example, the controller 240 transmits and receives a signal through the wireless communication interface 210 or the backhaul communication interface 220. In addition, the controller 240 writes and reads data in and from the storage 230. To this end, the controller 240 may include at least one processor.

Figure 3A:
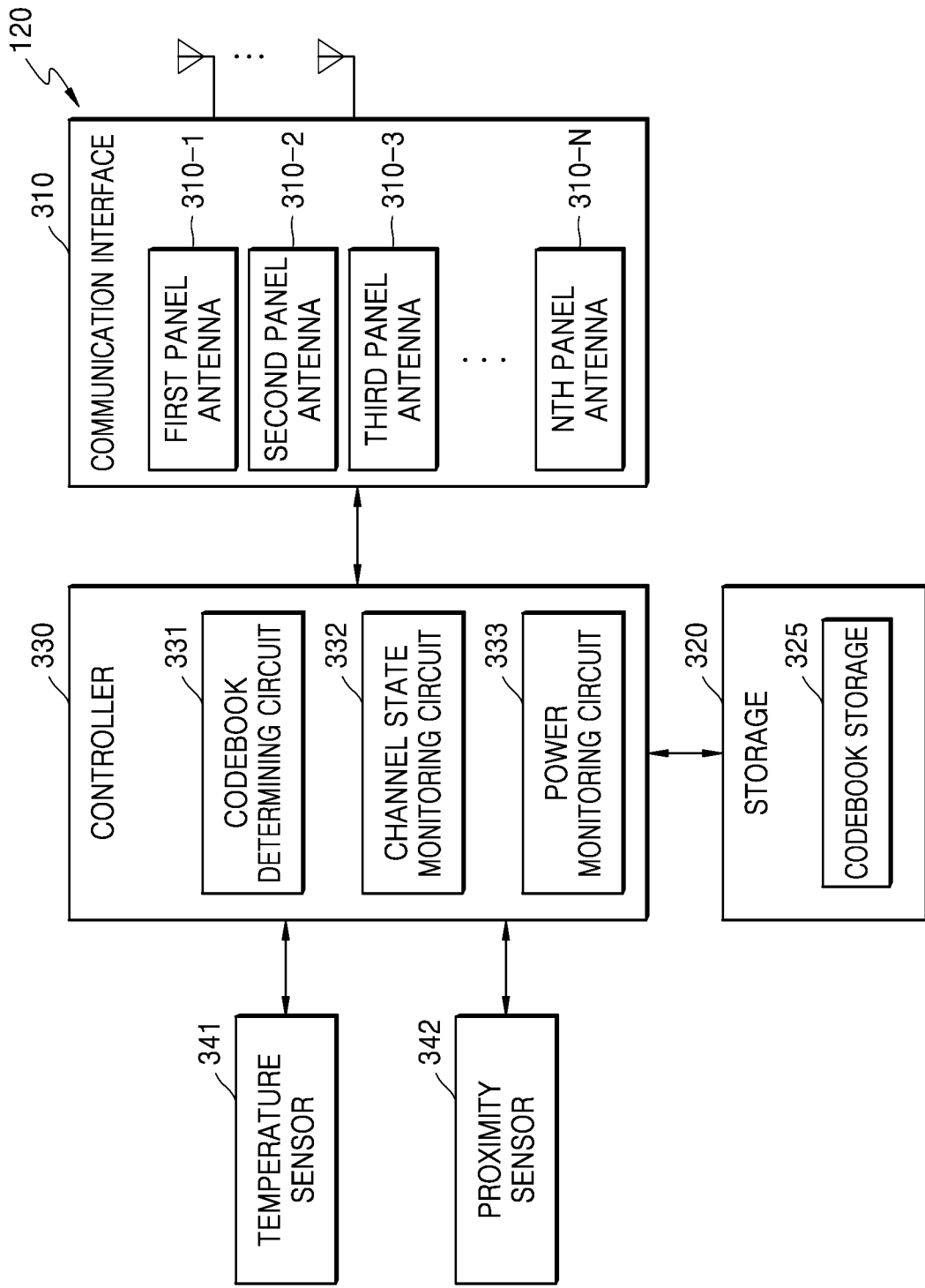
FIG. 3A is a block diagram of an electronic device according to example embodiments of the disclosure.

FIG. 3A is a block diagram of an electronic device according to example embodiments of the disclosure.

Referring to FIG. 3A, the electronic device 120 may include a communication interface 310, a storage 320, a controller 330.

The communication interface 310 performs functions for transmitting and receiving a signal through a radio channel. For example, the communication interface 310 performs a conversion function between a baseband signal and a bitstream according to a physical layer standard of a system. For example, the communication interface 310 may generate complex symbols by encoding and modulating a transmission bitstream during data transmission and restore a reception bitstream by demodulating and decoding a baseband signal during data reception. In addition, the communication interface 310 may up-convert a baseband signal into an RF band signal and then transmit the RF band signal through an antenna, or down-convert an RF band signal received through the antenna into a baseband signal. For example, the communication interface 310 may include a transmission filter, a reception filter, an amplifier, a mixer, an oscillator, a DAC, an ADC, and the like. The communication interface 310 may perform beamforming. The communication interface 310 may apply a beamforming weight to a signal to be transmitted or received in order to grant directivity to the signal. According to various example embodiments of the disclosure, the communication interface 310 may include a plurality of panel antennas, e.g., first to Nth panel antennas 310-1 to 310-N. According to an exemplary embodiment, each of the plurality of panel antennas 310-1 to 310-N may include an array antenna and may be arranged at arbitrary locations of the electronic device 120.

The communication interface 310 may transmit and receive a signal. The communication interface 310 may receive a downlink signal. The downlink signal may include a synchronization signal (SS), a reference signal (RS), system information, a configuration message, control information, downlink data, or the like. In addition, the communication interface 310 may transmit an uplink signal. The uplink signal may include a random access-related signal or reference signal (e.g., a sounding reference signal (SRS), or a demodulation reference signal (DM-RS)), uplink data, or the like.

The storage 320 may store basic programs for an operation of the electronic device 120, application programs, and data such as configuration information. The storage 320 may include a volatile memory, a nonvolatile memory, or a combination of the volatile memory and the nonvolatile memory. In addition, the storage 320 may provide stored data in response to a request of the controller 330. According to various embodiments of the disclosure, the storage 320 may include a codebook storage 325 storing information about a plurality of codebooks. The codebook storage 325 may store in advance information such as a beamforming weight for performing optimal beamforming with at least one panel antenna selected for wireless communication among the plurality of panel antennas 310-1 to 310-N.

The controller 330 controls a general operation of the electronic device 120. For example, the controller 330 may transmit and receive a signal through the communication interface 310. In addition, the controller 330 may write and read data in and from the storage 320. To this end, the controller 330 may include at least one processor or microprocessor or may be a part of a processor. When the controller 330 is a part of a processor, a part of the communication interface 310 and the controller 330 may be referred to as a communication processor (CP).

The controller 330 may include a codebook determining circuit 331, a channel state monitoring circuit 332 and a power monitoring circuit 333. The channel state monitoring circuit 332 may monitor channel states for the plurality of panel antennas 310-1 to 310-N and the power monitoring circuit 333 may monitor a power consumption values for the plurality of panel antennas 310-1 to 310-N. For example, the channel state monitoring circuit 332 and the power monitoring circuit 333 may periodically transmit a reference signal received power (RSRP) value and a power consumption value of each of the plurality of panel antennas 310-1 to 310-N to the codebook determining circuit 331.

The codebook determining circuit 331 may determine at least one panel antenna among the plurality of panel antennas 310-1 to 310-N according to environmental information and select an optimal codebook according to a scenario of the electronic device 120. For example, panel antennas for performing wireless communication may be determined by considering a temperature and power consumption of each panel antenna, and a codebook optimized to a used scenario such as a beam coverage or a beam width may be determined among a plurality of codebooks corresponding to the determined panel antennas.

According to an example embodiment, the controller may be communicated with one or more sensors, such as a temperature sensor 341 and a proximity sensor 342. The temperature sensor 341 and the proximity sensor 342 are provided as examples, but the disclosure is not limited thereto. Therefore, other types of sensors may be provided according to another example embodiment.

Figure 3B:
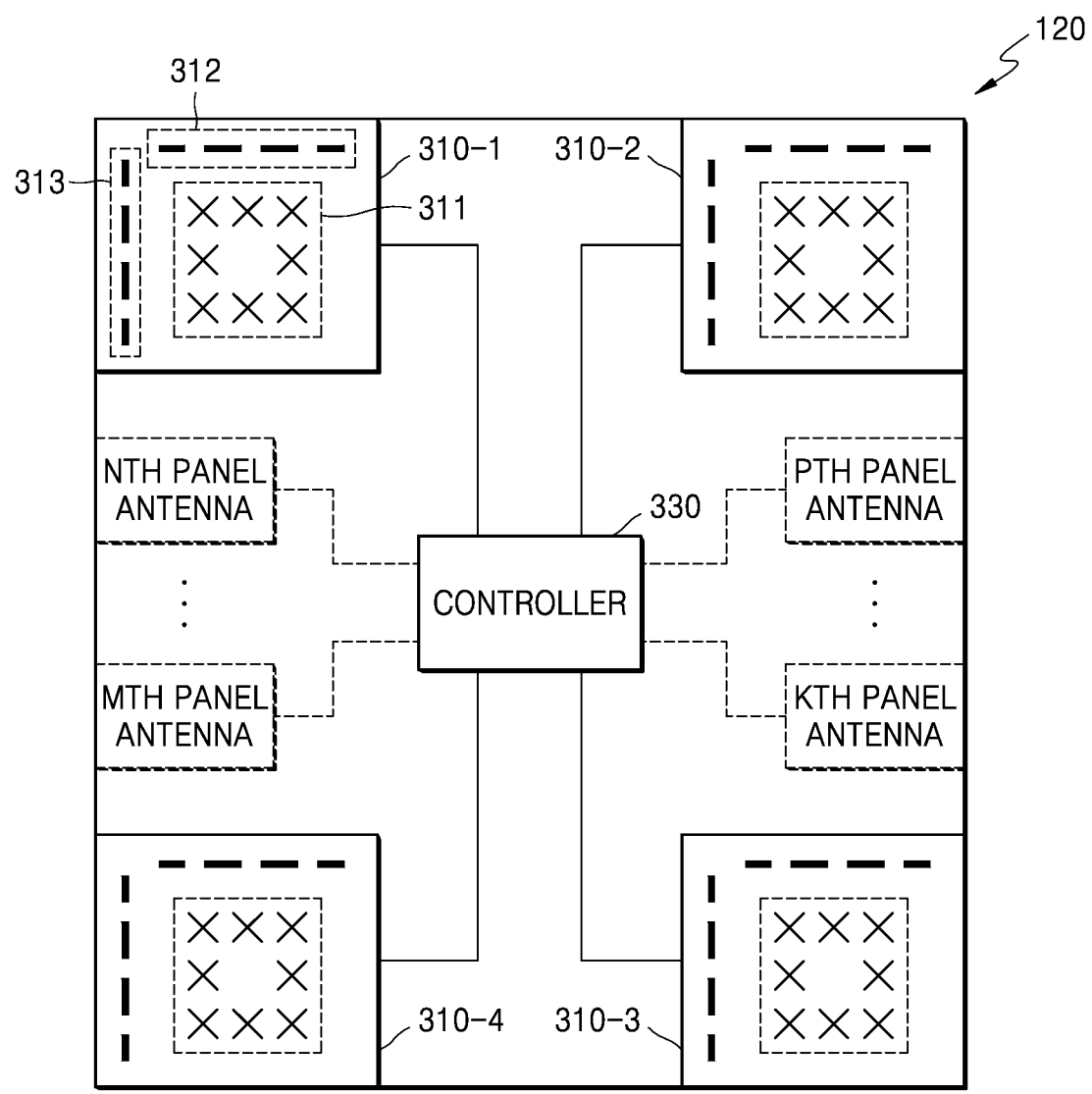
FIG. 3B is an arrangement diagram of a plurality of panel antennas according to example embodiments of the disclosure.

FIG. 3B is an arrangement diagram of a plurality of panel antennas according to example embodiments of the disclosure.

Referring to FIG. 3B, the electronic device 120 may include a plurality of panel antennas. For example, the electronic device 120 may include a first panel antenna 310-1 to a fourth panel antenna 310-4 arranged at corners of the electronic device 120.

Each of the plurality of panel antennas 310-1 to 310-N may include a plurality of array antennas. For example, the first panel antenna 310-1 may include a first array antenna 311, a second array antenna 312, and a third array antenna 313. Array antennas included in a same panel antenna may be different types of array antennas. The first array antenna 311 may correspond to a patch array, and the second array antenna 312 and the third array antenna 313 may correspond to a dipole array. The second array antenna 312 and the third array antenna 313 may form beams in side directions, respectively, and the first array antenna 311 may form a beam in a vertical direction with respect to a plane of the electronic device 120.

Each of the array antennas may include a plurality of antenna elements. Each of a plurality of antenna elements included in the second array antenna 312 and the third array antenna 313 may correspond to a dipole antenna element, and each of a plurality of antenna elements included in the first array antenna 311 may correspond to a patch antenna element.

Although the array antennas and the antenna elements have been described in the embodiment described above with reference to a dipole antenna and a patch antenna, the embodiment is not limited thereto. In addition, although a description has been made in the embodiment described above with reference to the four panel antennas arranged in the corners of the electronic device 120, a plurality of panel antennas (e.g., a Kth panel antenna to an Nth panel antenna, including Pth panel antenna and Mth panel antenna) may be further arranged.

Figure 4:
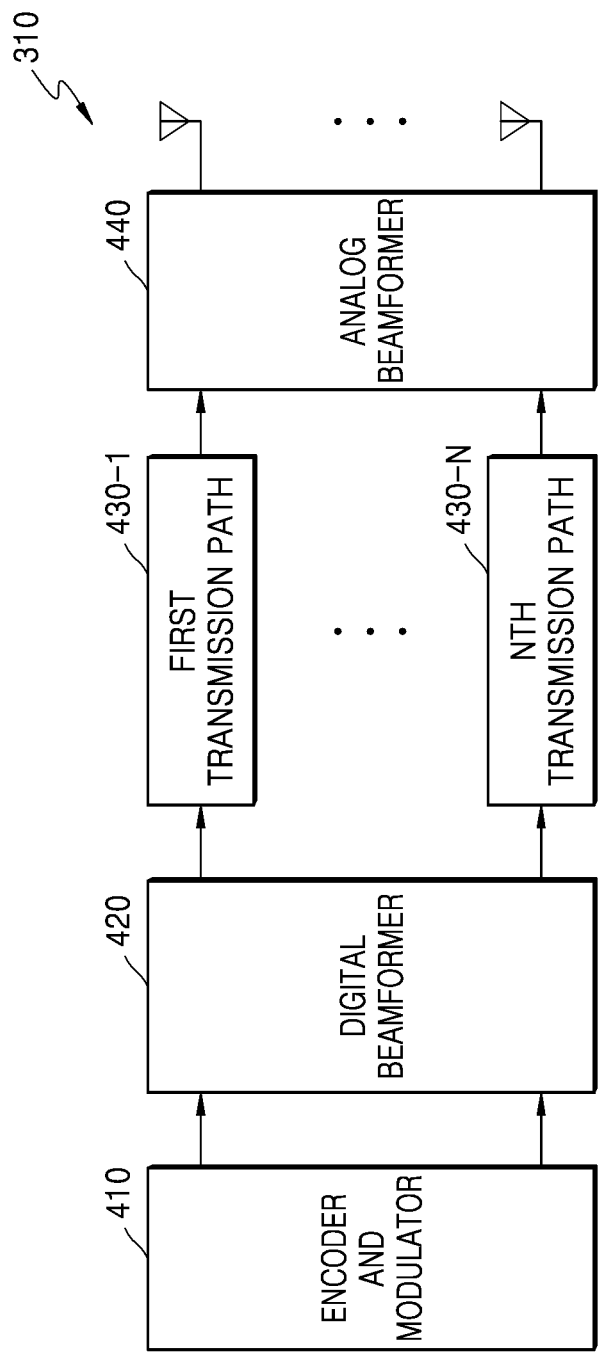
FIG. 4 is a block diagram of a communication interface according to example embodiments of the disclosure.

FIG. 4 is a block diagram of a communication interface according to example embodiments of the disclosure.

According to various embodiments of the disclosure, FIG. 4 shows an example of a detailed configuration of the communication interface 310 of FIG. 3A. Referring to FIG. 4, the communication interface 310 may be a circuit including an encoder and modulator 410, a digital beamformer 420, a first transmission path 430-1 to an Nth transmission path 430-N, and an analog beamformer 440.

The encoder and modulator 410 performs channel encoding. For the channel encoding, at least one of low density parity check (LDPC) code, convolution code, and polar code may be used. The encoder and modulator 410 generates modulation symbols by performing constellation mapping.

The digital beamformer 420 performs beamforming on a digital signal (e.g., the modulation symbols). To this end, the digital beamformer 420 multiplies the modulation symbols by beamforming weights. Herein, the beamforming weights are used to change a magnitude and a phase of a signal and may be referred to as 'precoding matrix', 'precoder', or the like. The digital beamformer 420 outputs digital-beamformed modulation symbols to the first transmission path 430-1 to the Nth transmission path 430-N. In this case, according to a MIMO transmission scheme, the modulation symbols may be multiplexed, or the same modulation symbols may be provided to the first transmission path 430-1 to the Nth transmission path 430-N.

The first transmission path 430-1 to the Nth transmission path 430-N convert digital-beamformed digital signals into analog signals. To this end, each of the first transmission path 430-1 to the Nth transmission path 430-N may include an inverse fast Fourier transform (IFFT) arithmetic operator, a cyclic prefix (CP) inserter, a DAC, and an up-converter. The CP inserter is for an orthogonal frequency division multiplexing (OFDM) scheme and may be excluded when another physical layer scheme (e.g., filter bank multi-carrier (FBMC)) is applied. That is, the first transmission path 430-1 to the Nth transmission path 430-N provide independent signal processing processes for a plurality of streams generated through digital beamforming. However, according to implementation schemes, some components in the first transmission path 430-1 to the Nth transmission path 430-N may be commonly used. The analog beamformer 440 performs beamforming on an analog signal. To this end, the analog beamformer 440 multiplies analog signals by beamforming weights. Herein, the beamforming weights are used to change a magnitude and a phase of a signal.

Although FIG. 4 shows an example based on a situation in which a signal is transmitted to another electronic device (e.g., the base station 110), the example embodiments of the disclosure are not limited thereto. When a radio signal is received from another electronic device, the communication interface 310 may include a decoder and demodulator and a plurality of reception paths. For example, the communication interface 310 may receive a radio signal, convert the radio signal into a digital signal, and decode and demodulate the digital signal.

Figure 5:
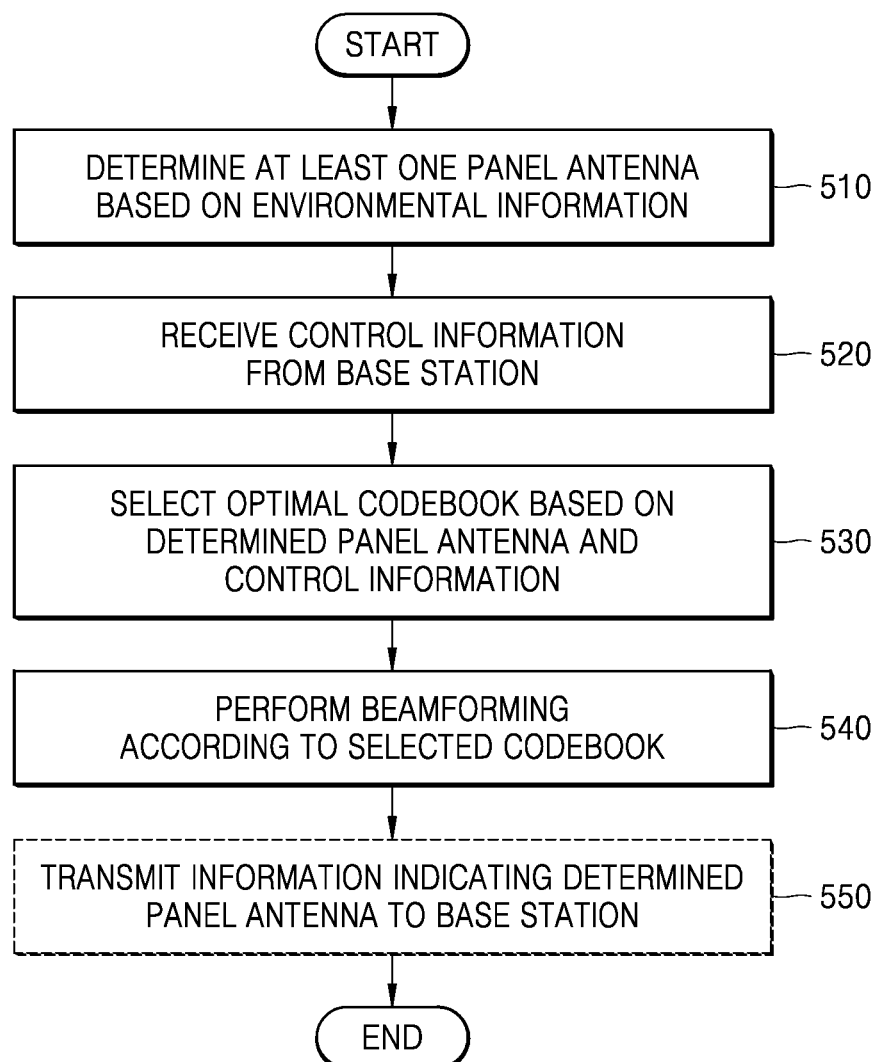
FIG. 5 is a flowchart of beamforming performed by an electronic device, according to example embodiments of the disclosure.

FIG. 5 is a flowchart of beamforming performed by an electronic device, according to example embodiments of the disclosure.

Referring to FIG. 5, in operation 510, the electronic device 120 may determine at least one panel antenna based on environmental information.

The environmental information may indicate information to be used for the electronic device 120 to determine which one of the plurality of panel antennas 310-1 to 310-N is selected when transmitting a radio signal. The environmental information may be referred to as various terms such as peripheral information or management information. The environmental information may include various pieces of information including information about a temperature of each of the plurality of panel antennas 310-1 to 310-N, information indicating a channel state, information about power consumption, a remaining battery capacity of the electronic device 120, and information about a shape in which a user holds the electronic device 120.

According to various example embodiments of the disclosure, the electronic device 120 may determine at least one panel antenna based on one or more pieces of environmental information. For example, the electronic device 120 may use only temperature information in the environmental information. The electronic device 120 may select at least one panel antenna for transmission and reception of a radio signal among panel antennas remaining by excluding panel antennas exceeding a threshold temperature from among the plurality of panel antennas 310-1 to 310-N. As another example, the electronic device 120 may determine at least one panel antenna based on temperature information and power information in the environmental information. The electronic device 120 may select an arbitrary number of panel antennas according to an order of lower power consumption among panel antennas remaining by excluding panel antennas exceeding the threshold temperature. Specific example embodiments of determining at least one panel antenna based on the environmental information will be described below with reference to FIGS. 6A to 6D.

In operation 520, the electronic device 120 may receive control information from the base station 110. The control information may include information for searching for an optimal beam between the base station 110 and the electronic device 120. For example, the control information may include information about a time point where a reference signal for beam sweeping is transmitted (e.g., which symbol timing number in which subframe number) and a length of an interval at which the reference signal is transmitted. In addition, the control information may include beam-related configuration information which the base station 110 requests from the electronic device 120. For example, the control information may include information related to characteristics required from a main lobe and a side lobe of a beam.

In operation 530, the electronic device 120 may select an optimal codebook based on the determined panel antenna and the control information received from the base station 110.

According to various embodiments of the disclosure, the electronic device 120 may store in advance information about a plurality of codebooks. The plurality of codebooks may respectively correspond to all sub sets available using the plurality of panel antennas 310-1 to 310-N. For example, assuming that the number of panel antennas 310-1 to 310-N is 4, the plurality of codebooks may include codebook information about four sub sets including only one activated panel antenna, six sub sets including two activated panel antennas, four sub sets including three activated panel antennas, and one sub set including all activated panel antennas. The electronic device 120 may include codebook information corresponding to a scenario preset for each sub set. This will be organized as follows.

TABLE 11

| Activated panel combination | Scenario#1 | Scenario#2 | ... | Scenario#K |
|---|---|---|---|---|
| #1 | Codebook#1-1 | Codebook#1-2 | ... | Codebook#1-K |
| #2 | Codebook#2-1 | Codebook#2-2 | ... | Codebook#2-K |

TABLE 11-continued

| Activated panel combination | Scenario#1 | Scenario#2 | ... | Scenario#K |
|---|---|---|---|---|
| #3 | Codebook#3-1 | Codebook#3-2 | ... | Codebook#3-K |
| #4 | Codebook#4-1 | Codebook#4-2 | ... | Codebook#4-K |
| #1, #2 | Codebook#12-1 | Codebook#12-2 | ... | Codebook#12-K |
| #1, #3 | Codebook#13-1 | Codebook#13-2 | ... | Codebook#13-K |
| #1, #4 | Codebook#14-1 | Codebook#14-2 | ... | Codebook#14-K |
| #2, #3 | Codebook#23-1 | Codebook#23-2 | ... | Codebook#23-K |
| #2, #4 | Codebook#24-1 | Codebook#24-2 | ... | Codebook#24-K |
| #3, #4 | Codebook#34-1 | Codebook#34-2 | ... | Codebook#34-K |
| #1, #2, #3 | Codebook#123-1 | Codebook#123-2 | ... | Codebook#123-K |
| #1, #2, #4 | Codebook#124-1 | Codebook#124-2 | ... | Codebook#124-K |
| #1, #3, #4 | Codebook#134-1 | Codebook#134-2 | ... | Codebook#134-K |
| #2, #3, #4 | Codebook#234-1 | Codebook#234-2 | ... | Codebook#234-K |
| #1, #2, #3, #4 | Codebook#1234-1 | Codebook#1234-2 | ... | Codebook#1234-K |

Referring to Table 1, there are a combinable number of sub sets corresponding to the plurality of panel antennas 310-1 to 310-N included in the electronic device 120, and codebooks corresponding to a plurality of scenarios using activated panel antennas may be defined in advance for the sub sets, respectively. Although Table 1 shows a case where the electronic device 120 includes four panel antennas, the present embodiment is not limited thereto, and a various number of scenarios and a various number of panel antennas may be used.

Each of the plurality of scenarios (first to Kth scenarios) shown in Table 1 may be determined at least based on a beamforming area of the electronic device 120 and beam-related configuration information between the base station 110 and the electronic device 120. For example, the beamforming area may be determined based on information about a beam coverage, a beam width, and mobility of the electronic device 120, and the beam-related configuration information may include information about the characteristics of a main lobe of a beam and the characteristics of a side lobe of the beam.

According to various embodiments of the disclosure, the electronic device 120 may select a panel antenna for transmission and reception of a radio signal based on the environmental information and determine a codebook optimal to the selected panel antenna. For example, the electronic device 120 may select a codebook according to one scenario among sub sets corresponding to activated panel antennas by considering reception timing of a beam management channel state information-reference signal (BM CSI-RS), the characteristics of a main lobe and a side lobe of a beam, a beam coverage, a beam width, mobility of the electronic device 120, and the like, which are obtainable from the control information.

In operation 540, the electronic device 120 may perform beamforming according to the selected codebook. The electronic device 120 may control the analog beamformer 440 and/or the digital beamformer 420 according to an analog beamforming parameter and a digital beamforming parameter stored in the selected codebook.

In operation 550, the electronic device 120 may transmit information indicating the determined panel antenna to the base station 110. The information indicating the determined panel antenna may be transmitted through signaling for an initial attach between the electronic device 120 and the base station 110 or transmitted by being included in periodic measurement report information or user equipment capability information of the electronic device 120.

According to the disclosure, the order of the operations 510 to 550 is not limited to the exemplary illustration in FIG. 5. According to other example embodiments of the disclosure, the order of the operations may be different, one or more other operations may be added, and one or more operations may be omitted.

Figure 6A:
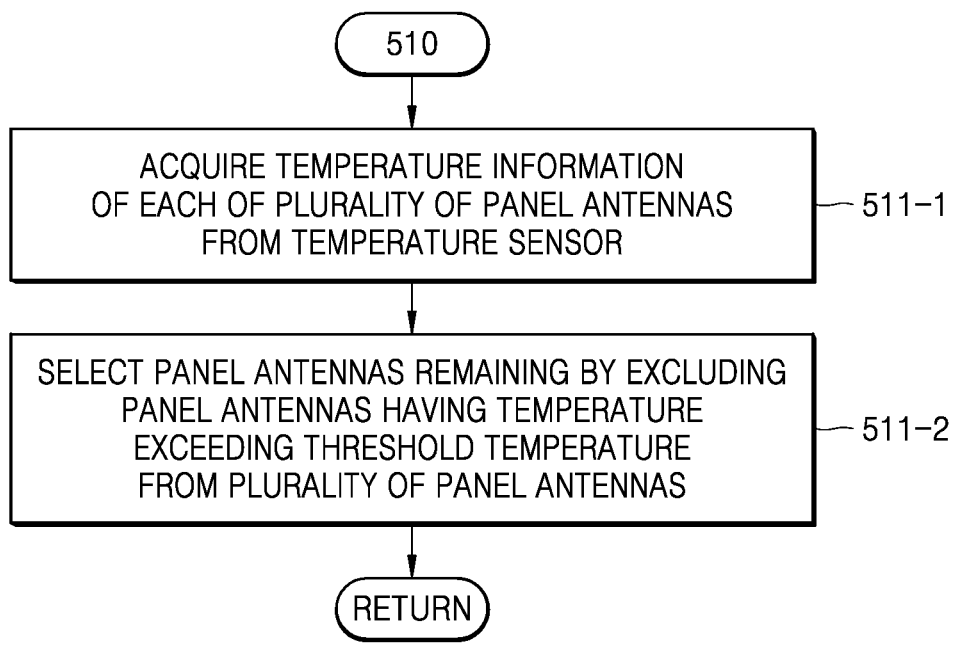
FIG. 6A is a flowchart of selecting a panel antenna according to temperature information, performed by the electronic device, according to an example embodiment of the disclosure.

FIG. 6A is a flowchart of selecting a panel antenna according to temperature information, performed by the electronic device, according to example embodiments of the disclosure.

Referring to FIG. 6A, in operation 511-1, the electronic device 120 may acquire temperature information of each of the plurality of panel antennas 310-1 to 310-N from a temperature sensor 341. The temperature sensor 341 may repetitively transmit the temperature information to the controller 330 in every previously determined period. The number of temperature sensors 341 may correspond to the number of panel antennas 310-1 to 310-N. That is, each of the plurality of panel antennas 310-1 to 310-N may be connected to a single temperature sensor 341.

The electronic device 120 may acquire the temperature information of each of the plurality of panel antennas 310-1 to 310-N and compare the temperature information with a threshold temperature value. The threshold temperature value may correspond to a value preset at a manufacturing time point. The threshold temperature value may indicate a temperature value that is too high to cause a malfunction of a component. For example, the threshold temperature value may be 90.

In operation 511-2, the electronic device 120 may select panel antennas remaining after excluding panel antennas of which a temperature exceeds the threshold temperature value from the plurality of panel antennas 310-1 to 310-N. The electronic device 120 may compare the temperature information of each of the plurality of panel antennas 310-1 to 310-N with the threshold temperature value and perform beamforming by excluding the panel antennas which may cause a malfunction. For example, it is assumed that the plurality of panel antennas 310-1 to 310-N include the first panel antenna 310-1 to the fourth panel antenna 310-4 and temperature values of the first panel antenna 310-1 to the fourth panel antenna 310-4 are 100, 70, 85, and 91, respectively. The electronic device 120 may exclude the first panel antenna 310-1 and the fourth panel antenna 310-4 of which temperatures exceed 90 that is the threshold temperature value. The electronic device 120 may determine that beamforming is to be performed based on the second panel antenna 310-2, the third panel antenna 310-3, and a combination thereof. Accordingly, the electronic device 120 may prevent in advance a malfunction due to a high temperature of panel antennas and acquire a general cooling effect.

Figure 6B:
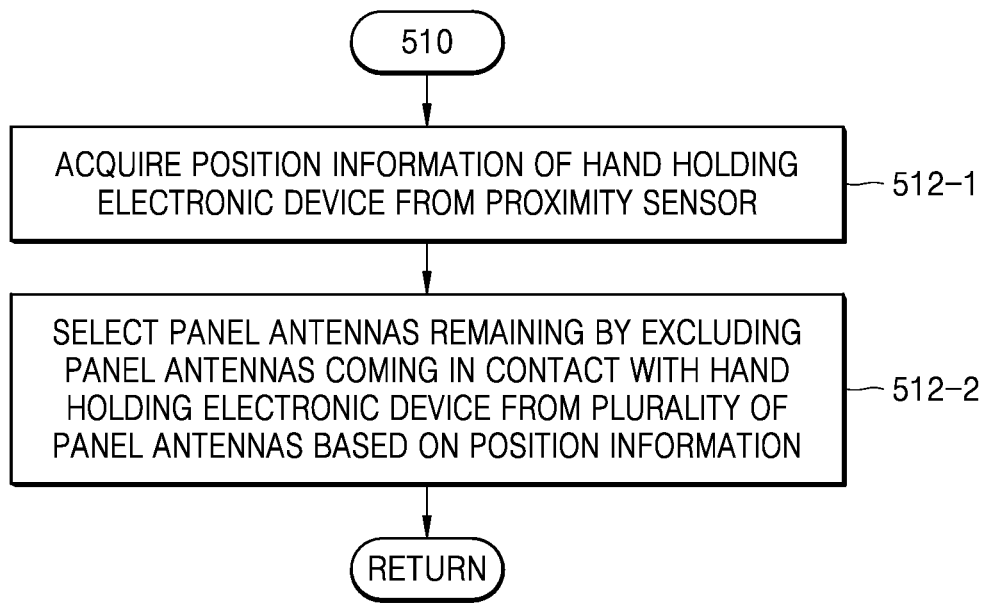
FIG. 6B is a flowchart of selecting a panel antenna according to holding information, performed by the electronic device, according to another example embodiment of the disclosure.

FIG. 6B is a flowchart of selecting a panel antenna according to hand holding position information, performed by the electronic device, according to example embodiments of the disclosure.

Referring to FIG. 6B, in operation 512-1, the electronic device 120 may acquire position information of a hand holding the electronic device 120 from a proximity sensor 342. The position information may include information about which portion of the electronic device 120 the user has held. The number of proximity sensors 342 may correspond to the number of panel antennas 310-1 to 310-N. That is, each of the plurality of panel antennas 310-1 to 310-N may be connected to a single proximity sensor 342.

According to another example embodiment, the electronic device 120 may acquire position information of an object covering (or blocking) a panel antenna from a proximity sensor 342. That is, the position information may correspond to an object different from a hand holding the electronic device. For instance, the object may be a case or a holder such as a holder for attaching the electronic device 120 to a vehicle.

The electronic device 120 may acquire position information from the proximity sensors 342 connected to the plurality of panel antennas 310-1 to 310-N and identify a panel antenna blocked by the user's hand. For example, when position information having a value of logic high or "1" is received from a proximity sensor 342 corresponding to the first panel antenna 310-1, it may be identified that the user comes in contact with the first panel antenna 310-1 while holding the electronic device 120 at present. As another example, when position information received from a proximity sensor 342 corresponding to the second panel antenna 310-2 has a value of logic low or "0", it may be identified that the user holds the electronic device 120 but does not come in contact with the second panel antenna 310-2.

In operation 512-2, the electronic device 120 may select at least one panel antenna among panel antennas remaining by excluding a panel antenna coming in contact with the hand holding the electronic device 120 from the plurality of panel antennas 310-1 to 310-N, based on the position information. The electronic device 120 may receive position information of the hand holding the electronic device 120 from the proximity sensors 342 respectively connected to the plurality of panel antennas 310-1 to 310-N and select at least one panel antenna among panel antennas identified not to come in contact with the user's hand. For example, when a value of position information received from the proximity sensor 342 connected to the first panel antenna 310-1 is "1" or logic high, if beamforming is performed through the first panel antenna 310-1, normal communication may not be performed because a formed beam is blocked by the user's hand. Therefore, the electronic device 120 may perform beamforming by using panel antennas remaining by excluding the panel antenna coming in contact with the user's hand. Accordingly, the electronic device 120 may exclude in advance a panel antenna which cannot form a beam, by using proximity sensor data even without measuring reception sensitivity of each of the plurality of panel antennas 310-1 to 310-N, thereby performing efficient beamforming.

Figure 6C:
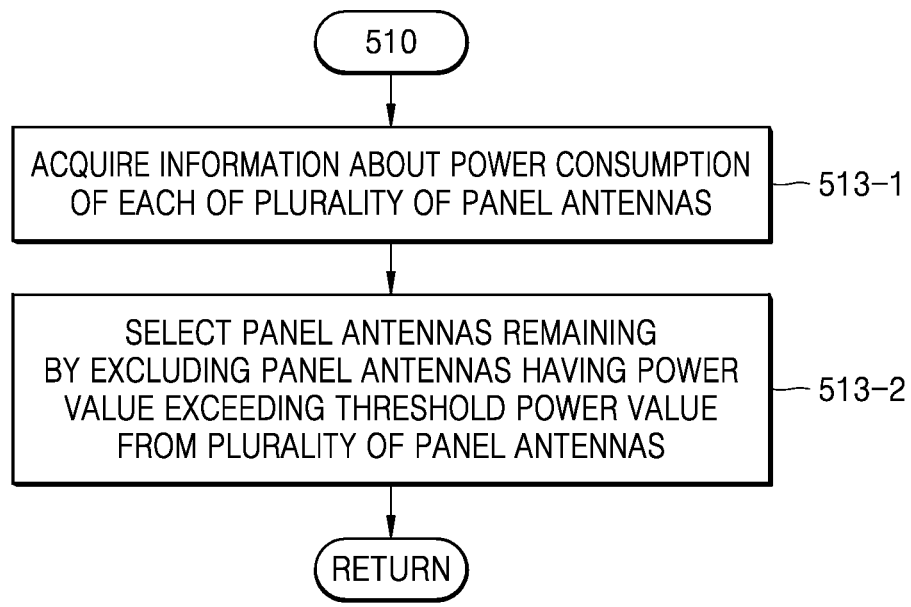
FIG. 6C is a flowchart of selecting a panel antenna according to power information, performed by the electronic device, according to another example embodiment of the disclosure.

FIG. 6C is a flowchart of selecting a panel antenna according to power information, performed by the electronic device, according to example embodiments of the disclosure.

Referring to FIG. 6C, in operation 513-1, the electronic device 120 may acquire information about power consumption of each of the plurality of panel antennas 310-1 to 310-N. The controller 330 of FIG. 3 may further include the power monitoring circuit 333, and the power monitoring circuit 333 may monitor a power value consumed by each of the plurality of panel antennas 310-1 to 310-N.

The electronic device 120 may acquire a power value consumed by each of the plurality of panel antennas 310-1 to 310-N, through the power monitoring circuit 333 and compare the acquired power value with a threshold power value. The threshold power value may be a preset value or may vary according to a remaining battery capacity of the electronic device 120. For example, when the remaining battery capacity of the electronic device 120 is 30%, the electronic device 120 may change the threshold power value to increase battery use efficiency.

In operation 513-2, the electronic device 120 may select panel antennas remaining by excluding panel antennas of which a power consumption value exceeds the threshold power value from the plurality of panel antennas 310-1 to 310-N. For example, when the plurality of panel antennas 310-1 to 310-N include the first panel antenna 310-1 to the fourth panel antenna 310-4 and the first panel antenna 310-1 and the second panel antenna 310-2 consume power exceeding the threshold power value, the electronic device 120 may perform beamforming according to the third panel antenna 310-3, the fourth panel antenna 310-4, and a combination thereof by excluding the first panel antenna 310-1 to the second panel antenna 310-2. Accordingly, the electronic device 120 may perform beamforming by using panel antennas with small power consumption, and thus battery use efficiency may be increased.

Figure 6D:
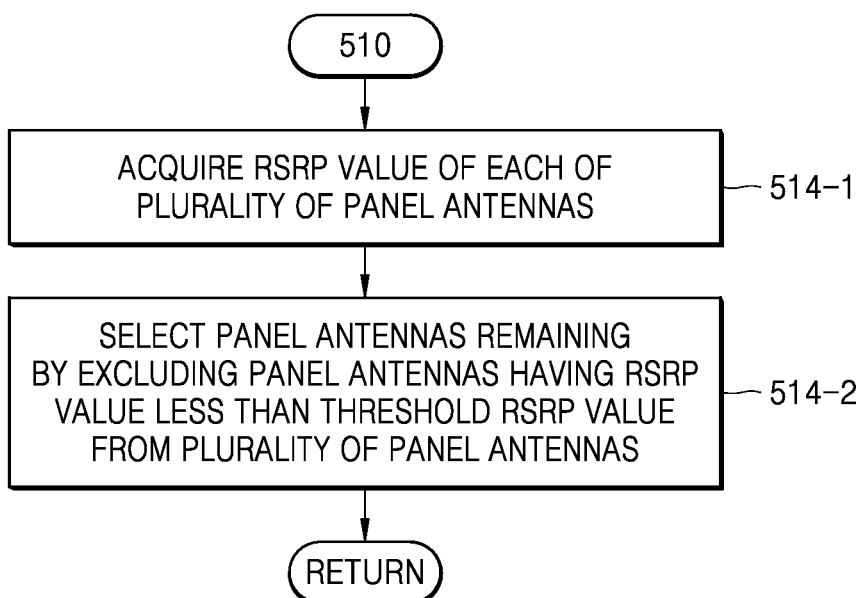
FIG. 6D is a flowchart of selecting a panel antenna based on a channel state, performed by the electronic device, according to another example embodiment of the disclosure.

FIG. 6D is a flowchart of selecting a panel antenna based on a channel state, performed by the electronic device, according to example embodiments of the disclosure.

Referring to FIG. 6D, in operation 514-1, the electronic device 120 may acquire an RSRP value of each of the plurality of panel antennas 310-1 to 310-N. The controller 330 of FIG. 3 may further include the channel state monitoring circuit 332, and the channel state monitoring circuit 332 may measure the RSRP value of each of the plurality of panel antennas 310-1 to 310-N. The RSRP value is merely used as a representative value of a state of a reception channel but is not limited thereto. For example, the electronic device 120 may acquire all types of information which may indicate a channel state, such as received signal strength indicator (RSSI) and reference signal received quality (RSRQ) in addition to the RSRP and measure channel quality based on the acquired information.

The electronic device 120 may acquire the RSRP value of each of the plurality of panel antennas 310-1 to 310-N through the channel state monitoring circuit 332 and compare the acquired RSRP value with a threshold RSRP value. The threshold RSRP value may be a preset value or a variable value. For example, when a communication type of the electronic device 120 is real-time communication (e.g., ultra reliable low latency communication (URLLC)) or communication requiring high quality of service (QoS), the electronic device 120 may increase the threshold RSRP value, thereby preventing in advance communication using a panel antenna having low reception sensitivity or bad channel quality.

In operation 514-2, the electronic device 120 may select panel antennas remaining by excluding panel antennas having an RSRP value less than the threshold RSRP value from the plurality of panel antennas 310-1 to 310-N. For example, the plurality of panel antennas 310-1 to 310-N may include the first panel antenna 310-1 to the fourth panel antenna 310-4, and RSRP values of the second panel antenna 310-2 and the third panel antenna 310-3 may be less than the threshold RSRP value. The electronic device 120 may perform beamforming according to the first panel antenna 310-1, the fourth panel antenna 310-4, and a combination thereof by excluding the second panel antenna 310-2 and the third panel antenna 310-3. Accordingly, the electronic device 120 may perform beamforming by using panel antennas having good channel quality or high reception sensitivity. According to the embodiment described above, although panel antennas having an RSRP value less than the threshold RSRP value are excluded, the embodiment is not limited thereto. The electronic device 120 may set the threshold RSRP value and select panel antennas having an RSRP value greater than the threshold RSRP value.

Referring to FIGS. 6A to 6D, although the electronic device 120 selects at least one panel antenna based on one piece of information in the environmental information, the embodiments with reference to FIGS. 6A to 6D are not limited thereto. According to various embodiments of the disclosure, the electronic device 120 may select a panel antenna based on at least two pieces of information in the environmental information. For example, the electronic device 120 may select at least one panel antenna by considering both temperature information and a power consumption value.

Figure 7:
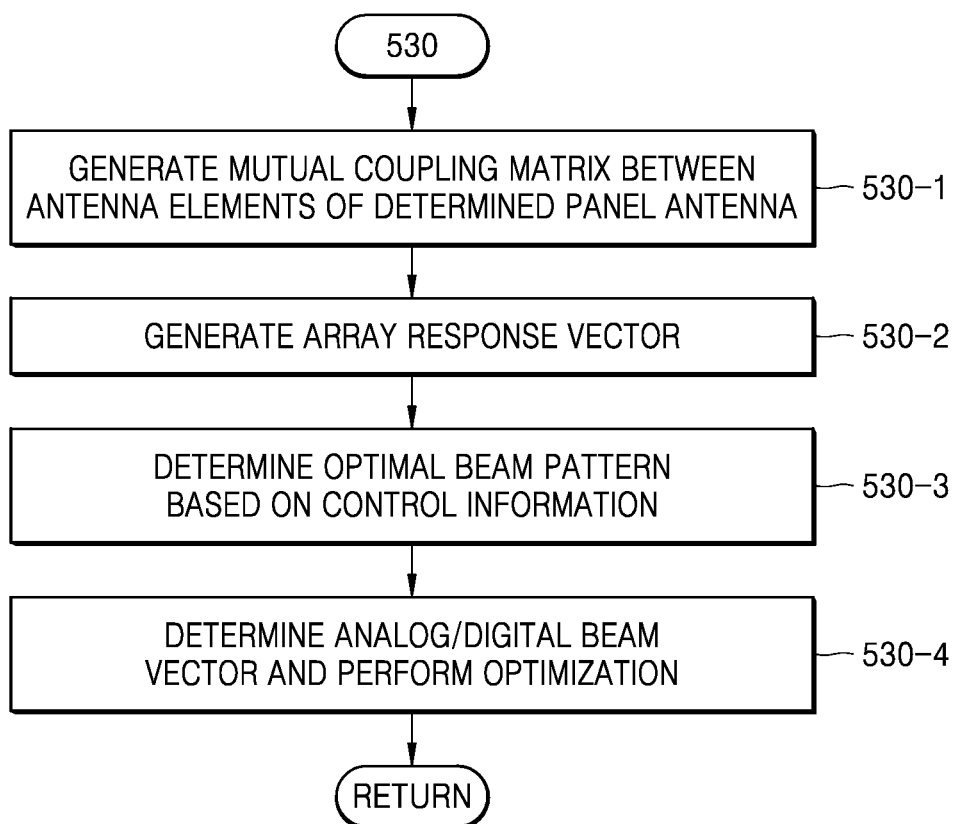
FIG. 7 is a flowchart of selecting an optimal codebook, performed by the electronic device, according to another example embodiment of the disclosure.

FIG. 7 is a flowchart of selecting an optimal codebook, performed by the electronic device, according to example embodiments of the disclosure.

Figure 8:
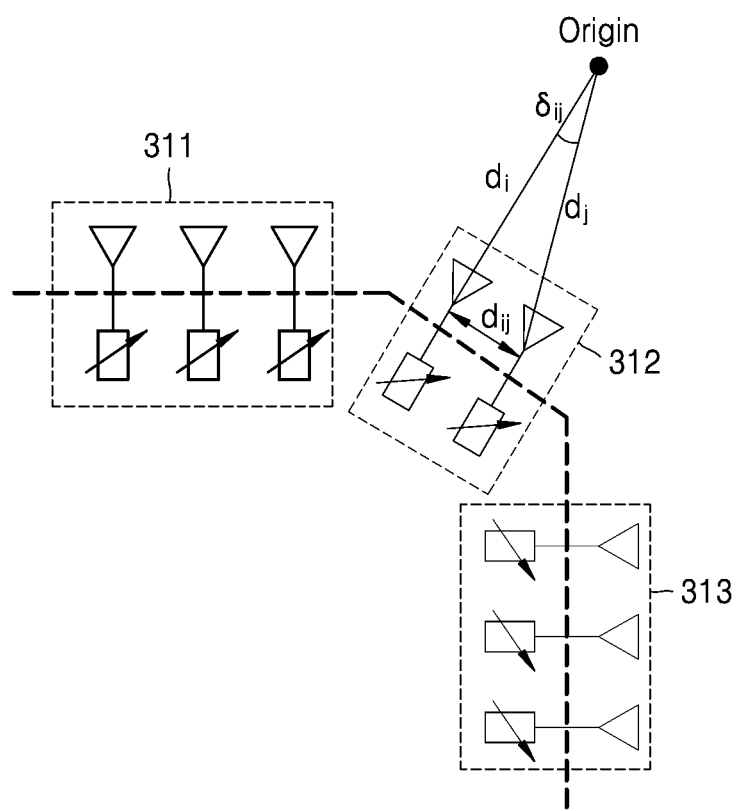
FIG. 8 illustrates an example of mutual coupling between antenna elements, according to example embodiments of the disclosure.

Referring to FIG. 7, in operation 530-1, the electronic device 120 may generate a mutual coupling matrix between antenna elements of the determined panel antenna. The mutual coupling matrix may be generated by actual measurement or determined by modeling as shown in FIG. 8. The mutual coupling matrix may correspond to the followings. Referring to FIG. 8, the first array antenna 311, the second array antenna 312, and the third array antenna 313 are shown. Mutual coupling between antenna elements may occur not only between neighboring antenna elements in a same array antenna (e.g., the second array antenna 312) but also between antenna elements in different array antennas (e.g., the first array antenna 311 and the third array antenna 313).

$$C=(Z_A+Z_L)(Z_L I_N+Z)^{-1} \quad \text{[Equation 1]}$$

In Equation 1, $Z_A$ may denote an antenna impedance, $Z_L$ may denote a load impedance, and Z may denote a mutual impedance matrix ($I_N$ may denote an N-dimensional unit matrix).

For a dipole antenna array, each antenna element may be defined by, $Z_{ij}=R_{ij}+jX_{ij}$ and a reactance component and a resistance component may be expressed as below.

$$R_{ij} = \frac{\sqrt{\mu_0}}{4\pi\sqrt{\varepsilon_0}} [2C_{in}(\mu_0) - C_{in}(\mu_1) - C_{in}(\mu_2)] \quad \text{[Equation 2]}$$

$$X_{ij} = \frac{\sqrt{\mu_0}}{4\pi\sqrt{\varepsilon_0}} [2S_{in}(\mu_0) - S_{in}(\mu_1) - S_{in}(\mu_2)] \quad \text{[Equation 3]}$$

In Equations 2 and 3, $\mu_0$ may denote a magnetic constant, $\varepsilon_0$ may denote an electric constant, $\mu_0=2\pi d_{ij}$, $\mu_1=2\pi(1+\sqrt{d_{i,j}^2+l^2})$, $\mu_2=2\pi(-1+\sqrt{d_{i,j}^2+l^2})$, and l may denote a dipole antenna length, $d_{ij}=\sqrt{d_i^2+d_j^2-2d_i d_j\cos\delta_{ij}}$. In addition, in Equations 2 and 3, cosine integral and sine integral functions are respectively as below, and γ may denote an Euler-Mascheroni constant.

$$C_{in}(x) = \gamma + \ln(x) + \int_0^x \frac{\cos t - 1}{t} dt \quad \text{[Equation 4]}$$

$$S_{in}(x) + \int_0^x \frac{\sin t - 1}{t} dt \quad \text{[Equation 5]}$$

In operation 530-2, the electronic device 120 may generate an array response vector. The array response vector may be generated based on modeling. For example, assuming that an origin is a reference point (i.e., zero degree) of a phase response, a phase response of an azimuth angle Ø and an elevation angle θ in a polar coordinate system ($d_x$, $\delta_x$) may be expressed as below.

$$\exp\left(-\frac{2\pi d_x}{\lambda}(\cos\delta_x\cos\phi\sin\theta + \sin\delta_x\sin\phi_p\sin\theta)\right) \quad \text{[Equation 6]}$$

Herein, assuming that an ith antenna is on a polar axis, corresponding polar coordinates are ($d_i$, 0), and a phase response thereof is as below.

$$a_i(\phi, \theta) = \exp\left(-\frac{2\pi d_x}{\lambda}\cos\phi\sin\theta\right) \quad \text{[Equation 7]}$$

In addition, a phase response of the remaining antenna elements is as below.

$$a_j(\phi, \theta) = \left(-\frac{2\pi}{\lambda}(d_j\cos\delta_j\cos\phi\sin\theta + d_j\sin\delta_j\sin\phi\sin\theta)\right) \quad \text{[Equation 8]}$$

$$= \exp\left(-\frac{2\pi d_j\sin\theta_p}{\lambda}(\cos\delta_j\cos\phi + \sin\delta_j\sin\phi)\right)$$

$$= \exp\left(-\frac{2\pi d_j}{\lambda}\cos(\phi - \delta_j)\sin\theta\right)$$

Respective components of an array response vector corresponding to an azimuth angle $Ø_p$ and an elevation angle $Ø_p$ are a product of the phase response and an antenna unique pattern characteristic $g(Ø_p, \theta)$ and may be expressed as below.

$$\tilde{a}(Ø,\theta)=g(Ø,\theta)\times a(Ø,\theta) \quad \text{[Equation 9]}$$

Therefore, an array response vector a(Ø,θ) may be expressed as below.

$$a(Ø,\theta)=[\tilde{a}_0(Ø,\theta), \ldots, \tilde{a}_n(Ø,\theta), \ldots, \tilde{a}_{N-1}(Ø,\theta)]^H \quad \text{[Equation 10]}$$

In operation 530-3, the electronic device 120 may determine an optimal beam pattern based on control information. According to various embodiments of the disclosure, the optimal beam pattern may be set according to use purposes. For example, the optimal beam pattern may be determined based on a beam coverage, a beam width, beam sweeping timing, a time interval length, a structure of selected panel arrays, and the like. A particular embodiment of determining the optimal beam pattern will be described below with reference to FIG. 10.

In operation 530-4, the electronic device 120 may determine an analog/digital beam vector and perform optimization. For example, a beam shape in a direction (e.g., φ in the horizontal direction and θ in the vertical direction) when a beam vector (or a weight vector) of an antenna array is given is as below.

$$G(\{Ø,\theta\},b)=a^H(Ø,\theta)\cdot C\cdot b \quad \text{[Equation 11]}$$

Herein, to achieve a desired beam pattern, the beam vector of the antenna array may be optimized to minimize distortion of the beam pattern. For example, the electronic device 120 may perform the optimization by weighting the distortion of the beam pattern.

$$b_{opt} = arg\min_{b} \int_{-\pi}^{\pi}\int_{-\pi}^{\pi} w(\phi, \theta) \times \quad \text{[Equation 12]}$$
$$|G_{desired}(\phi, \theta) - G(\{\phi, \theta\}, b)|d\phi d\theta$$

Herein, w(Ø,θ) may denote a weight for importance of a corresponding direction. In addition, to reduce complexity, the beam pattern may be derived by performing evaluation only in an existing sampling direction.

$$b_{opt} = arg\min_{b} \sum_{q1=0}^{Q1}\sum_{q2=0}^{Q2}[w(\phi_{q1}, \theta_{q2}) \times \quad \text{[Equation 13]}$$
$$|G_{desired}(\phi_{q1}, \theta_{q2}) - G(\{\phi_{q1}, \theta_{q2}\}, b)|]$$

According to various embodiments of the disclosure, when a beam vector $b_{opt}$ is determined, the electronic device 120 may identify operations of an analog end and a digital end. The identification of the analog end and the digital end may be determined according to a connection relationship of the analog end and the digital end. Once a form of $B_{Analog}$ and $b_{digital}$ is determined according to a beamforming structure, the connection relationship of the analog end and the digital end may be derived through Equation 14. The optimization is to minimize the distortion of the beam pattern. A weight may be granted to the distortion of the beam pattern.

$$(B_{Analog}, b_{digital}) = \quad \text{[Equation 14]}$$
$$arg\min_{B_{Analog}, b_{digital}} \int_{-\pi}^{\pi}\int_{-\pi}^{\pi} \tilde{w}(\phi, \theta) \times |G(\{\phi, \theta\}, b_{opt}) -$$
$$G(\{\phi, \theta\}, B_{Analog} \cdot b_{digital})|d\phi d\theta \text{ such that}$$
$$B_{Analog} \in F_{Analog} \text{ and } b_{digital} \in F_{Digital}$$

Herein, $F_{Analog}$ and $F_{Digital}$ are implementable beamforming sets satisfying restricted conditions of hardware, and $\tilde{w}(Ø,θ)$ may denote a weight for importance of a corresponding direction.

$$(B_{Analog}, b_{digital}) = \quad \text{[Equation 15]}$$
$$arg\min_{B_{Analog}, b_{digital}} \sum_{q1=0}^{Q1}\sum_{q2=0}^{Q2}[w(\phi_{q1}, \theta_{q2}) \times |G(\{\phi_{q1}, \theta_{q2}\},$$
$$b_{opt}) - G(\{\phi_{q1}, \theta_{q2}\}, B_{Analog} \cdot b_{digital})|]$$
$$\text{such that } B_{Analog} \in F_{Analog} \text{ and } b_{digital} \in F_{Digital}$$

$$(B_{Analog}, b_{digital}) = \quad \text{[Equation 16]}$$
$$arg\min_{b}\|C \cdot b_{opt} - C \cdot B_{Analog} \cdot b_{digital}\|_2^2 \text{ such}$$
$$\text{that } B_{Analog} \in F_{Analog} \text{ and } b_{digital} \in F_{Digital}$$

According to various example embodiments of the disclosure, the electronic device 120 may reduce complexity by applying the equations above.

Figure 9A:
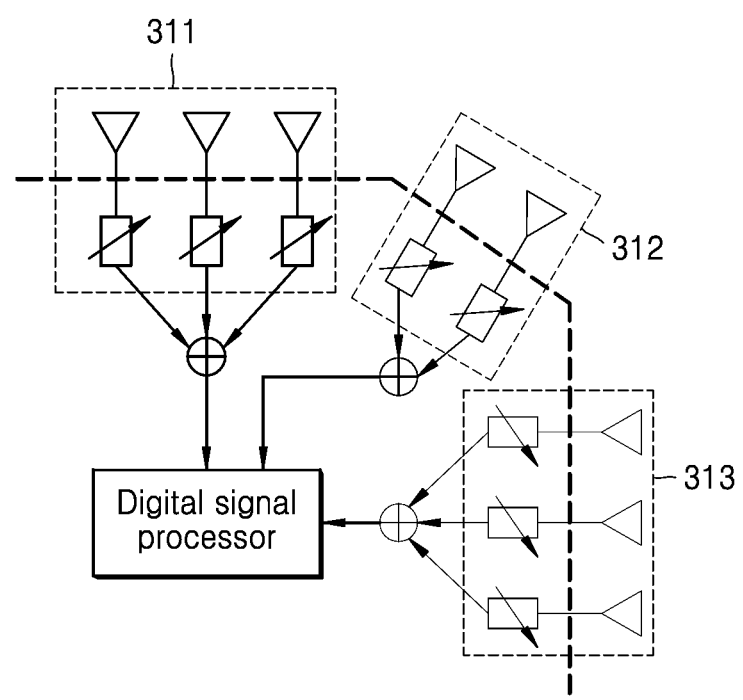
FIG. 9A illustrates an example of analog/digital beamforming according to an example embodiment of the disclosure.
Figure 9B:
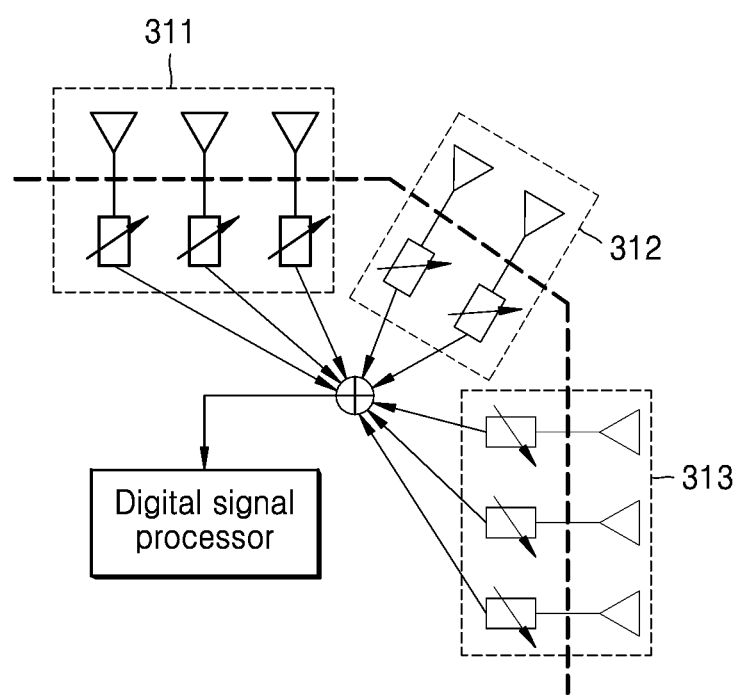
FIG. 9B illustrates another example of analog/digital beamforming according to another example embodiment of the disclosure.

FIGS. 9A and 9B illustrate examples of analog/digital beamforming according to example embodiments of the disclosure.

Referring to FIG. 9A, a panel antenna and array antennas included therein are shown. The first array antenna 311, the second array antenna 312 and the third array antenna 313 may independently perform beamforming. For example, each of a signal from the first array antenna 311, a signal from the second array antenna 312, and a signal from the third array antenna 313 may be processed by a digital signal processor. Therefore, beamforming may be performed by differently weighting each array antenna.

Referring to FIG. 9B, the first array antenna 311 to the third array antenna 313 may perform beamforming dependently to each other. For example, signals from the first array antenna 311, the second array antenna 312, and the third array antenna 313 are added as a single signal prior to processing by the digital signal processor, and thus, a different weight cannot be applied to each array antenna, and a beam may be formed according to a common beamforming weight.

Figure 10:
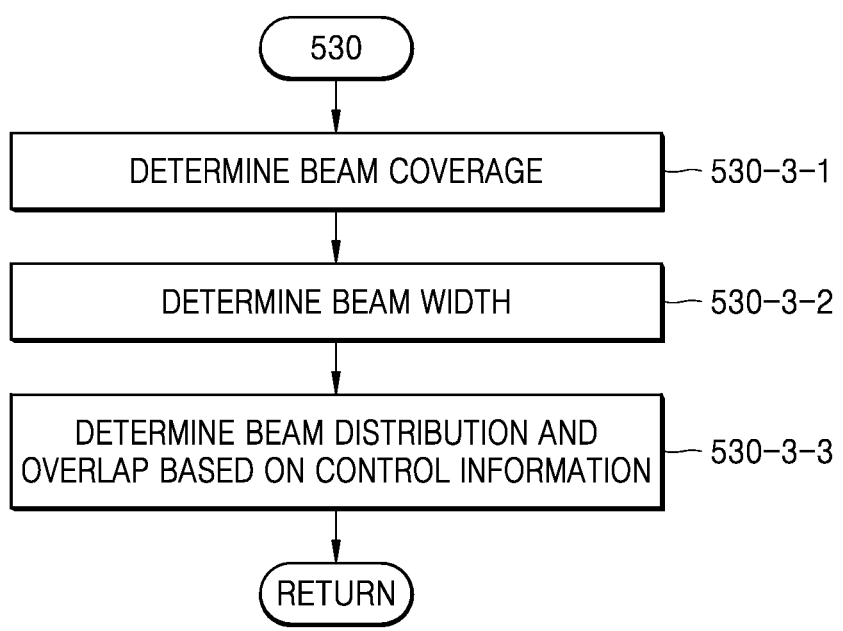
FIG. 10 is a flowchart of selecting an optimal beam pattern, performed by the electronic device, according to example embodiments of the disclosure.

FIG. 10 is a flowchart of selecting an optimal beam pattern, performed by the electronic device, according to example embodiments of the disclosure.

Referring to FIG. 10, in operation 530-3-1, the electronic device 120 may determine a beam coverage. The beam coverage may indicate a direction having a certain range in which a beam is to be formed by the electronic device 120 by reflecting a position related to the base station 110.

In operation 530-3-2, the electronic device 120 may determine a beam width. The electronic device 120 may determine the beam width by considering mobility, i.e., a moving speed, of the electronic device 120. For example, when the electronic device 120 moves fast, if communication is performed with beams having a narrow beam width, beam sweeping should be frequently performed. Therefore, when the electronic device 120 moves fast, it may be determined that beams having a wide beam width are generated.

In operation 530-3-3, the electronic device 120 may determine a beam distribution and overlap/non-overlap based on the control information.

The control information is information received from the base station and may include information indicating beam sweeping timing and an interval length. Therefore, the electronic device 120 may receive the control information and determine overlap for stably performing beam sweeping with the determined beam coverage and beam width. For example, when a beam coverage area is wide, and the beam width is wide, beamforming may be performed to overlap between neighboring beams, thereby directly or indirectly measuring channel quality in all the directions of the wide coverage. The electronic device 120 may determine a beam distribution based on a connection relationship of the selected panel antennas. For example, as shown in FIG. 9A, when the first array antenna 311 to the third array antenna 313 may be independently controlled, beams may be non-uniformly arranged in the beam coverage. As another example, as shown in FIG. 9B, when the first array antenna 311 to the third array antenna 313 are dependently controlled, beams may be uniformly arranged in the beam coverage.

According to the embodiments described above, it has been described that the electronic device 120 selects at least one panel antenna based on environmental information and transmits information indicating the selected at least one panel antenna to the base station 110, but the embodiments are not limited thereto. According to various embodiments of the disclosure, the base station 110 may indicate at least one panel antenna for uplink transmission. For example, the base station 110 may transmit transmission configuration indicator (TCI) information or information indicating identification (ID) of a panel antenna of the electronic device 120 to the electronic device 120 in a downlink transmission process to determine at least one panel antenna of the electronic device 120.

According to an embodiment of the disclosure, the base station 110 may transmit the TCI information to the electronic device 120. The TCI information may be transmitted to the electronic device 120 through downlink control information (DCI). The TCI information may be information indicating an antenna port of the electronic device 120. The antenna port may not correspond to a physical panel antenna but indicate panel antennas having same or similar communication environments. The panel antennas having the same or similar communication environments may be quasi-co-located (QCL) to each other. The QCL relationship may indicate a relationship in which it may be assumed that large-scale properties of a signal received from one antenna port of the electronic device 120 are at least partially the same as large-scale properties of a signal received from another antenna port. For example, the large-scale properties may include Doppler spread and Doppler shift related to a frequency offset, average delay and delay spread related to a time offset, and the like. That is, the plurality of panel antennas 310-1 to 310-N of the electronic device 120 may be grouped into QCL panel antennas. For example, TCI0 may indicate a first antenna group including QCL panel antennas, and TCI1 may indicate a second antenna group including QCL panel antennas having a different channel characteristic from the first antenna group. That is, the first antenna group and the second antenna group may be different groups in terms of the properties of Doppler spread, Doppler shift, average delay, delay spread, and the like.

The electronic device 120 may receive TCI information from the base station 110 and identify a panel antenna group indicated by the received TCI information. For example, when the base station 110 transmits TCI0, the electronic device 120 may identify a first antenna group. Herein, each antenna group indicated by TCI information may be mapped and stored in advance. The electronic device 120 may select at least one panel antenna based on the environmental information among the panel antennas included in the identified first antenna group. The selecting, performed by the electronic device 120, at least one panel antenna based on the environmental information is the same as described above, and a detailed description thereof is omitted. That is, the base station 110 may transmit TCI information to the electronic device 120 to receive an uplink signal through panel antennas corresponding to a channel characteristic selected by the base station 110.

As another example, the base station 110 may transmit panel antenna ID information to the electronic device 120 to determine a panel antenna through which an uplink signal is to be transmitted. It may be assumed that the base station 110 has performed beam training or beam sweeping by transmitting and receiving a reference signal before transmitting the panel antenna ID information through a downlink. That is, the base station 110 may acquire in advance ID information of each panel antenna of the electronic device 120 through beam training with the electronic device 120. The base station 110 may determine a panel antenna for an uplink and transmit ID information indicating the determined panel antenna to the electronic device 120 via DCI. The electronic device 120 may decode the received panel antenna ID information to identify a panel antenna which the base station 110 wants to use for an uplink and transmit an uplink signal to the base station 110 through the identified panel antenna.

According to another example embodiment of the disclosure, the electronic device 120 may determine at least one panel antenna further based on environmental information in addition to TCI information or panel antenna ID information. For example, when the electronic device 120 receives TCI information, the electronic device 120 may identify one antenna group by decoding the TCI information. The electronic device 120 may select at least one panel antenna by using environmental information among a plurality of panel antennas included in the identified antenna group. For example, the electronic device 120 may transmit and receive a radio signal by using panel antennas remaining by excluding at least one of panel antennas of which a temperature exceeds the threshold temperature, panel antennas coming in contact with the user's hand, panel antennas of which a power consumption value exceeds the threshold power value, and panel antennas having an RSRP value less than the threshold RSRP value from the panel antennas included in the first antenna group. When all the panel antennas included in the first antenna group are not suitable for transmission and reception (e.g., when all the panel antennas included in the first antenna group have a temperature exceeding the threshold temperature), the electronic device 120 may transmit an uplink signal by using a panel antenna of which a temperature exceeds the threshold temperature and also transmit a signal indicating that panel antenna change is needed, for reliable reception of the base station 110. Alternatively, to prevent a malfunction of the electronic device 120, the electronic device 120 may bypass selection of the first antenna group, which has been indicated by the base station 110, and transmit the uplink signal by using other panel antennas.

According to another example embodiment, when the electronic device 120 receives panel antenna ID information, the electronic device 120 may further determine whether a panel antenna indicated by the panel antenna ID information has a temperature exceeding the threshold temperature, has an RSRP value less than the threshold RSRP value, consumes power exceeding the threshold power value, and comes in contact with the user's hand. Even though a temperature of a panel antenna selected by the base station 110 exceeds the threshold temperature, the electronic device 120 may transmit an uplink signal through the panel antenna indicated by the panel antenna ID information and also transmit a signal indicating that panel antenna change is needed in the future, for reliable reception of the base station 110. Alternatively, to prevent a malfunction of the electronic device 120, the electronic device 120 may transmit uplink information through another panel antenna selected based on environmental information instead of the panel antenna indicated by the received panel antenna ID information.

While the disclosure has been particularly shown and described with reference to embodiments thereof, it will be understood that various changes in form and details may be made therein without departing from the spirit and scope of the following claims.

What is claimed is:

1. An electronic device comprising:
    a communication interface comprising a plurality of panel antennas configured to perform directional transmission or reception;
    a storage storing information about a plurality of codebooks;
    one or more sensors configured to detect one of first information or second information, the first information indicating a temperature for each of the plurality of panel antennas, or the second information indicating a panel antenna among the plurality of panel antennas which is in physical contact with hand of a user; and
    a controller configured to:
        determine at least one panel antenna among the plurality of panel antennas based on environmental information corresponding to the plurality of panel antennas detected by the electronic device, the environmental information including the first information and the second information,
        receive control information from a base station through the communication interface, and
        select an optimal codebook among the plurality of codebooks based on the determined at least one panel antenna and the received control information,
        wherein the optimal codebook is selected by determining an optimal beam pattern based on one of determining a beam coverage, determining a beam width, determining a beam distribution or determining an overlap based on the control information.

2. The electronic device of claim 1, wherein
    the controller is further configured to perform beamforming based on the selected optimal codebook.

3. The electronic device of claim 1, wherein
    the controller is further configured to transmit third information indicating the determined at least one panel antenna to the base station through the communication interface.

4. The electronic device of claim 1, wherein the first information is measured by using a temperature sensor among the one or more sensors, and
    wherein the controller is further configured to:
        compare the temperature of each of the plurality of panel antennas with a threshold temperature, and
        determine the at least one panel antenna among panel antennas remaining by excluding panel antennas having a temperature exceeding the threshold temperature from the plurality of panel antennas.

5. The electronic device of claim 1, wherein the second information is measured by using a proximity sensor among the one or more sensors, and
    wherein the controller is further configured to determine the at least one panel antenna among panel antennas remaining by excluding panel antennas being in physical contact with the hand of the user.

6. The electronic device of claim 1, wherein the control information received from the base station comprises:
    fourth information about timing and a time interval at which a reference signal for beam sweeping is transmitted; and
    configuration information of a beam.

7. The electronic device of claim 6, wherein the controller is configured to select the optimal codebook by generating a mutual coupling matrix between antenna elements included in the determined at least one panel antenna, determining an array response vector for the determined at least one panel antenna based on the mutual coupling matrix, determining the optimal beam pattern based on the control information received from the base station, determining an analog/digital beam vector, and performing optimization to select the optimal codebook.

8. The electronic device of claim 7, wherein
    the controller is configured to select the optimal beam pattern by determining the beam coverage, determining the beam width, and determining the beam distribution and determining the overlap based on the control information.

9. An electronic device comprising:
    a communication interface comprising a plurality of panel antennas configured to perform directional transmission or reception;
    a storage storing information about a plurality of codebooks; and
    a controller configured to:
        determine at least one panel antenna among the plurality of panel antennas based on environmental information corresponding to the plurality of panel antennas detected by the electronic device, the environmental information including at least one of first information about power consumption of each of the plurality of panel antennas, and second information about a channel state of each of the plurality of panel antennas, receive control information from a base station through the communication interface, and
        select an optimal codebook among the plurality of codebooks based on the determined at least one panel antenna and the received control information,
        wherein the optimal codebook is selected by determining an optimal beam pattern based on one of determining a beam coverage, determining a beam width, determining a beam distribution or determining an overlap based on the control information.

10. The electronic device of claim 9, wherein
    the controller is further configured to perform beamforming based on the selected optimal codebook.

11. The electronic device of claim 9, wherein
    the controller is further configured to transmit third information indicating the determined at least one panel antenna to the base station through the communication interface.

12. The electronic device of claim 9, wherein
    the controller is configured to:
        compare the power consumption by each of the plurality of panel antennas with a threshold power consumption value, based on the first information, and
        select a panel antenna among panel antennas that remain after excluding panel antennas which consume power exceeding the threshold power consumption value from the plurality of panel antennas as the determined at least one panel antenna.

13. The electronic device of claim 9, wherein
    the controller is further configured to:
        compare a channel quality value of each of the plurality of panel antennas with a threshold quality value, based on the second information, and
        select a panel antenna having a channel quality value exceeding the threshold quality value among the plurality of panel antennas as the determined at least one panel antenna.

14. The electronic device of claim 13, wherein
the second information indicating the channel state comprises at least one of reference signal received power (RSRP), received signal strength indicator (RSSI), and reference signal received quality (RSRQ).

15. The electronic device of claim 9, wherein the control information received from the base station comprises:
fourth information about timing and a time interval at which a reference signal for beam sweeping is transmitted; and
configuration information of a beam.

16. The electronic device of claim 15, wherein
the controller is configured to select the optimal codebook by generating a mutual coupling matrix between antenna elements included in the determined at least one panel antenna, determining an array response vector for the determined at least one panel antenna based on the mutual coupling matrix, determining the optimal beam pattern based on the control information received from the base station, determining an analog/digital beam vector, and performing optimization to select the optimal codebook.

17. The electronic device of claim 16, wherein
the controller is configured to select the optimal beam pattern by determining the beam coverage, determining the beam width, and determining the beam distribution and determining the overlap based on the control information.

18. An electronic device comprising:
a memory storing one or more instructions; and
a processor configured to execute the one or more instructions to:
obtain at least one panel antenna, among a plurality of panel antennas configured to perform directional transmission or reception, based on information corresponding to one or more of the plurality of panel antennas detected by the electronic device;
receive control information from a base station; and
select an optimal codebook, among a plurality of codebooks, based on the obtained at least one panel antenna and the received control information,
wherein the optimal codebook is selected by determining an optimal beam pattern based on one of determining a beam coverage, determining a beam width, determining a beam distribution or determining an overlap based on the control information.

19. The electronic device of claim 18, wherein
the information corresponding to the one or more of the plurality of panel antennas is environmental information obtained from a sensor proximal to the plurality of panel antennas.

20. The electronic device of claim 19, wherein
the environmental information comprises one of temperature values corresponding to each of the plurality of panel antennas or proximity information indicating whether an object is proximal to the each of the plurality of panel antennas.

* * * * *